US005332627A

United States Patent [19]

Watanabe et al.

[11] Patent Number: 5,332,627

[45] Date of Patent: Jul. 26, 1994

[54] FIELD EMISSION TYPE EMITTER AND A METHOD OF MANUFACTURING THEREOF

[75] Inventors: Hidetoshi Watanabe; Hiroshi Komatsu; Toshiaki Hasegawa; Toshiyuki Ishimaru, all of Tokyo, Japan

[73] Assignee: Sony Corporation, Tokyo, Japan

[21] Appl. No.: 783,165

[22] Filed: Oct. 28, 1991

[30] Foreign Application Priority Data

Oct. 30, 1990 [JP] Japan ................................ 2-293182
Oct. 30, 1990 [JP] Japan ................................ 2-293183
Oct. 30, 1990 [JP] Japan ................................ 2-293184
Jan. 14, 1991 [JP] Japan ................................ 3-014726

[51] Int. Cl.[5] ................................ B32B 9/00

[52] U.S. Cl. ................................ 428/426; 428/131; 428/446; 428/569; 428/901

[58] Field of Search ................ 428/901, 131, 426, 446, 428/569

[56] References Cited

U.S. PATENT DOCUMENTS 3,921,022 11/1975 Levine .
4,708,904 11/1987 Shimizu et al. .................... 428/209

FOREIGN PATENT DOCUMENTS 0278405 7/1977 European Pat. Off. .
0288616 2/1988 European Pat. Off. .
0290026 9/1988 European Pat. Off. .

OTHER PUBLICATIONS

Article "Microtips Fluroescent Display"—Mayer et al. 512—Japan Display—four pages.
Article "Microtips Fluorescent Display" By Meyer et al.

*Primary Examiner*—Patrick J. Ryan
*Assistant Examiner*—Kam F. Lee

[57] ABSTRACT

A field emission type emitter comprises: a conductive substrate; an insulating film formed on the conductive substrate; a cavity formed in the insulating film; a cathode formed on the conductive substrate in the cavity; and a gate electrode formed over the insulating film. The gate electrode is preferably made of refractory metal silicide. A polycrystalline silicon film is preferably formed between the gate electrode and the insulating film. The side walls of the insulating film in the portion of the cavity preferably have an inverse tapered shape.

In the case where a glass substrate is used, a conductive film is formed on the glass substrate through an insulating film and the cathode is formed on the conductive film in the cavity. Manufacturing methods of the field emission type emitter are also disclosed.

7 Claims, 12 Drawing Sheets

FIELD EMISSION TYPE EMITTER AND A METHOD OF MANUFACTURING THEREOF

BACKGROUND OF THE INVENTION

1. Field of the Invention

The invention relates to a field emission type emitter and a method of manufacturing thereof which can be suitably applied to a flat pannel display such as a flat CRT.

2. Description of the Prior Art

Hitherto, as a field emission type emitter of the size of the micron order, a emitter called a Spindt type has been known. Its manufacturing method is as follows.

As shown in FIG. 1A, after a silicon dioxide ($SiO_2$) film 2 was first formed onto a conductive silicon (Si) substrate 1 by a thermal oxidation method, a CVD method or a sputtering method, a molybdenum (Mo) film 3 is formed onto the $SiO_2$ film 2 by a sputtering method or an electron beam evaporation deposition method as a material to form a gate electrode. A thickness of the $SiO_2$ film 2 is about 1 to 1.5 μm. A thickness of the Mo film 3 is thousands Å, for example. After that, a resist pattern 4 having a shape corresponding to a gate electrode to be formed is formed onto the Mo film 3 by a lithography.

Then, the resist pattern 4 is used as a mask and the Mo film 3 is etched by a wet etching method or a dry etching method, thereby forming a gate electrode 5 as shown in FIG. 1B. The gate electrode 5 has an opening 5*a* having, for example, a circular shape having a diameter of about 1 μm.

Subsequently, the resist pattern 4 and the gate electrode 5 are used as masks and the $SiO_2$ film 2 is etched by a wet etching method, thereby forming a cavity 2*a* as shown in FIG. 1C.

After the resist pattern 4 was removed, an oblique evaporation deposition is executed by an electron beam evaporation deposition method in a direction with a predetermined inclination angle to the substrate surface, thereby forming a peeling-off layer 6 made of, e.g., aluminum (Al) on the gate electrode 5 as shown in FIG. 1D. The oblique evaporation deposition is executed while the Si substrate 1 is rotated around its center.

Then, Mo is evaporation deposited by an electron beam evaporation deposition method as a material to form a cathode in the direction perpendicular to the substrate surface. Due to this, as shown in FIG. 1E, a cathode 7 is formed on the Si substrate 1 in the cavity 2*a*. Reference numeral 8 denotes a Mo film formed on the peeling-off layer 6 at the time of the evaporation deposition. A thickness of the Mo film 8 is about 1 to 2 μm.

After that, the peeling-off layer 6 is removed by a lift-off method together with the Mo film 8 formed thereon, thereby completing a target field emission type emitter as shown in FIG. 1F.

Since it is necessary to execute the electron emission from the cathode 7 in the vacuum of about $10^{-6}$ Torr or less, the above field emission type emitter is actually sealed in the vacuum by opposite plates and other members (not shown).

The above conventional field emission type emitter shown in FIG. 1F has the following many drawbacks. That is, since the above refractory metal such as Mo which is used as a material of the gate electrode 5 is likely to be oxidized, the gate electrode 5 is easily oxidized in the manufacturing process and an electric conductivity decreases. Thus, the electron emission from the cathode 7 cannot be stably performed. There is also a case where a deformation of the gate electrode 5 occurs due to the oxidation. Further, since an internal residual stress due to a film formation of the refractory metal such as Mo or the like is large, a deformation of the gate electrode 5 easily occurs. Consequently, the gate electrode 5 is easily peeled off from the $SiO_2$ film 2.

Further, in the manufacturing method of the above conventional field emission type emitter, to actually execute the lift-off of the Mo film 8, it is necessary that an etchant solution for lift-off reaches the peeling-off layer 6 under the Mo film 8. However, as shown in FIG. 1E, the Mo film 8 covers the substrate surface almost completely, so that a thin portion of the Mo film 8 just over the cathode 7 is the only place where the etchant solution for lift-off can enter below the Mo film 8. Therefore, the etchant solution for lift-off is hard to reach the peeling-off layer 6, so that it is difficult to actually execute the lift-off.

This problem takes a remarkable effect, especially in the case of forming a large area field emission type emitter array. That is, in the field emission type emitter array, the pitch of the cathode 7 is set to, e.g., about 10 μm, while the diameter of the opening 5*a* of the gate electrode 5 which is formed just over the cathode 7 is set to about 1 μm and is very small as compared with the pitch of the cathode 7. In this case, there is no place where the etchant solution for lift-off can enter below the Mo film 8.

As a result, the lift-off could not be executed partly or the thin Mo film 8 was left on the peeling-off layer 6, and the lift-off could not be executed completely. In addition, even if the lift-off could be executed completely, the lift-off took a fairly long time and the productivity was low.

Further, since the conventional field emission type emitter shown in FIG. 1F mentioned above has an overhanging structure in which the gate electrode 5 is projected to the inside of the cavity 2*a* in parallel with the substrate surface, there are problems such that the gate electrode 5 is weak in terms of structure and a peel-off or the like from the $SiO_2$ film 2 is likely to occur.

On the other hand, a field emission type emitter of a structure as shown in FIG. 2 has also been known. As shown in FIG. 2, in the field emission type emitter, the side walls of a cavity 12*a* formed in an $SiO_2$ film 12 are perpendicular to the substrate surface. Such a cavity 12*a* is formed by a reactive ion etching (RIE) method. Reference numerals 11, 13, and 14 denote a Si substrate, a cathode and a gate electrode, respectively.

The conventional field emission type emitter shown in FIG. 2 has a structure such that the whole gate electrode 14 is supported by the $SiO_2$ film 12, so that the gate electrode 14 is strong in terms of structure. In this case, however, there are the following problems. That is, in the case of actually forming the cavity 12*a* by an RIE method, it is not always easy to control the shape of the bottom portion because a diameter of cavity 12*a* is small. Therefore, there is a case where the side walls of the cavity 12*a* are not always perpendicular to the substrate surface and a diameter of bottom portion is small. In such a case, there are fears such that a defective shape of the cathode 13 which is formed in the cavity 12*a* occurs and a defective insulation between the cathode 13 and the gate electrode 14 occurs.

OBJECTS AND SUMMARY OF THE INVENTION

It is, therefore, the first object of the invention to provide a field emission type emitter which can stably emit electrons from a cathode.

The second object of the invention is to provide a field emission type emitter which can prevent a deformation of a gate electrode due to oxidation or the like.

The third object of the invention is to provide a field emission type emitter which can realize a large area of a flat pannel display using a field emission type emitter array or the like.

The fourth object of the invention is to provide a field emission type emitter which can reduce the manufacturing costs.

The fifth object of the invention is to provide a field emission type emitter in which a danger such that a crack or a warp of a substrate occurs is small.

The sixth object of the invention is to provide a field emission type emitter in which a gate electrode is strong in terms of structure and a defective insulation between a cathode and the gate electrode due to a defective shape of the cathode can be prevented.

The seventh object of the invention is to provide a method of manufacturing a field emission type emitter in which a gate electrode is strong in terms of structure and a defective insulation between a cathode and the gate electrode due to a defective shape of the cathode can be prevented.

The eighth object of the invention is to provide a method of manufacturing a field emission type emitter in which the lift-off of a film formed on a peeling-off layer when a cathode is formed can be executed completely and in a short time.

According to an aspect of the invention, there is provided a field emission type emitter comprising:

a conductive substrate;

an insulating film formed on the conductive substrate;

a cavity formed in the insulating film;

a cathode formed on the conductive substrate in the cavity; and a gate electrode formed over the insulating film, wherein the gate electrode is made of refractory metal silicide.

According to another aspect of the invention, there is provided a field emission type emitter comprising:

a glass substrate;

a first insulating film formed on the glass substrate;

a conductive film formed on the first insulating film;

a second insulating film formed on the glass substrate;

a second insulating film formed on the conductive film and/or the first insulating film;

a cavity formed in the second insulating film;

a cathode formed on the conductive film in the cavity; and a gate electrode formed over the second insulating film.

According to another aspect of the invention, there is provided a field emission type emitter comprising:

a conductive substrate;

an insulating film formed on the conductive substrate;

a cavity formed in the insulating film;

a cathode formed on the conductive substrate in the cavity; and a gate electrode formed over the insulating film, wherein the side walls of the insulating film in the portion of the cavity have an inverse tapered shape.

According to still another aspect of the invention, there is provided a method of manufacturing a field emission type emitter which is constructed by a conductive substrate, an insulating film formed on the conductive substrate, a cavity formed in the insulating film, a cathode formed on the conductive substrate in the cavity, and a gate electrode formed on the insulating film, comprising the steps of:

sequentially forming the insulating film and the conductive film to form the gate electrode onto the conductive substrate;

forming a resist pattern having a shape corresponding to the gate electrode onto the conductive film to form the gate electrode;

forming the gate electrode by etching the conductive film to form the gate electrode by using the resist pattern as a mask;

anisotropically etching the insulating film in a direction which is almost perpendicular to the surface of the conductive substrate by using the gate electrode as a mask; and wet etching the insulating film by using the gate electrode as a mask.

According to yet another aspect of the invention, there is provided a method of manufacturing a field emission type emitter comprising a substrate, an insulating film formed on the substrate, a cavity formed in the insulating film, a cathode formed on the substrate in the cavity, and a gate electrode formed over the insulating film, comprising the steps of:

forming the insulating film having the cavity and the gate electrode onto the substrate and thereafter forming a peeling-off layer on the gate electrode by executing a first evaporation deposition in an oblique direction to the surface of the substrate;

forming the cathode by executing a second evaporation depositoin in a direction perpendicular to the surface of the substrate;

partially exposing the peeling-off layer by etching off the film formed on the peeling-off layer by the second evaporation deposition; and removing the peeling-off layer by a lift-off method together with the film.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Embodiments of the invention will be described hereinbelow with reference to the drawings.

Figure 1A:
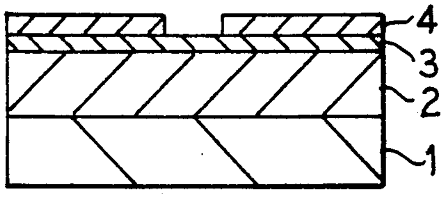
FIG. 1A (PRIOR ART)
FIGS. 1A to 1F are cross sectional views for explaining a manufacturing method of the conventional field emission type emitter.
Figure 1B:
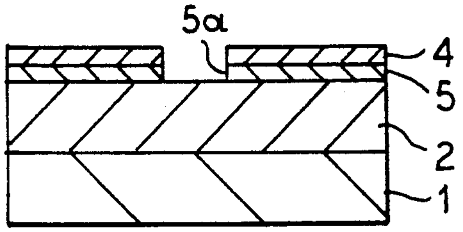
FIG. 1B (PRIOR ART)
Figure 1C:
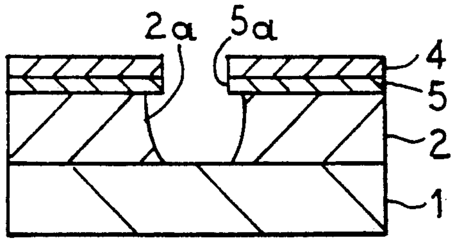
FIG. 1C (PRIOR ART)
Figure 1D:
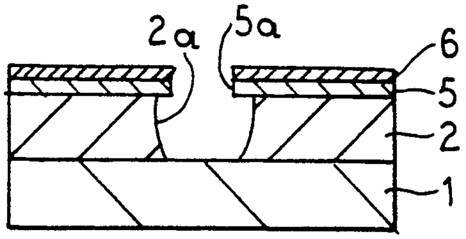
FIG. 1D (PRIOR ART)
Figure 1E:
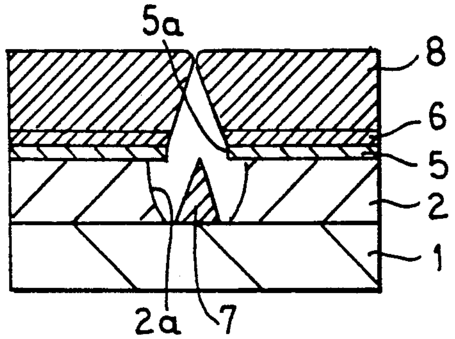
FIG. 1E (PRIOR ART)
Figure 1F:
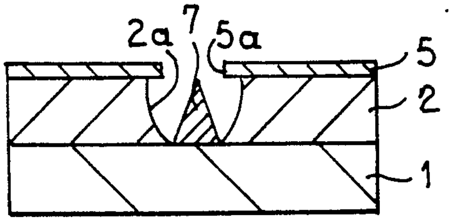
FIG. 1F (PRIOR ART)
Figure 2:
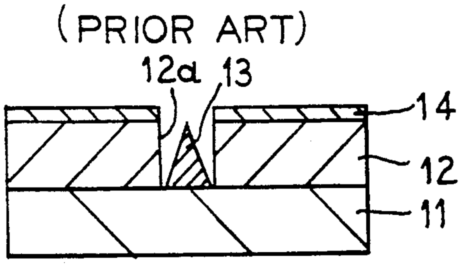
FIG. 2 (PRIOR ART)
FIG. 2 is a cross sectional view showing another conventional field emission type emitter.
Figure 3:
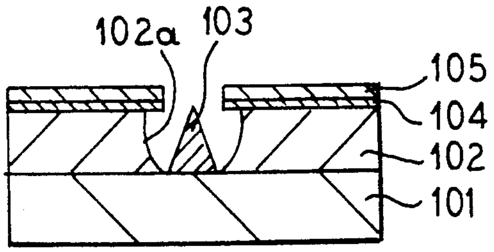
FIG. 3 is a cross sectional view showing a field emission type emitter according to the first embodiment of the invention.

As shown in FIG. 3, in a field emission type emitter according to the first embodiment, an insulating film 102 such as an $SiO_2$ film having a film thickness of about 1 μm is formed on a conductive substrate 101 such as an Si substrate in which impurities of, e.g., the n type or p type have been doped at a high concentration. A cavity 102*a* having, for instance, a circular flat shape is formed in the insulating film 102. A conical cathode 103 having a pointed tip and made of metal such as Mo, tungsten (W), or the like having a high melting point and a low work function is formed on the conductive substrate 101 in the cavity 102*a*.

A gate electrode 105 made of refractory metal silicide such tungsten silicide as ($WSi_x$) is formed over the insulating film 102 around the cavity 102*a* through a polycrystalline Si film 104 so as to surround the cathode 103. A thickness of polycrystalline Si film 104 is set to a value within a range, e.g., about from 500 to 1000 Å. A thickness of refractory metal silicide film such as a $WSi_x$ film which forms the gate electrode 105 is set to a value within a range from 0.2 to 0.5 μm. An Si composition ratio x of $WSi_x$ is preferably selected to a value within a range from 2.4 to 2.8. When x lies within the above range, an internal residual stress upon formation of the $WSi_x$ film is minimum. Further, if $x>2$, $SiO_2$ is easily formed when $WSi_x$ is oxidized, so that the oxidation of W is effectively suppressed. A diameter of opening portion of the gate electrode 105 just over the cathode 103 is set to, e.g., about 1 μm.

By arranging the cavities 102*a* and cathodes 103 of the numbers corresponding to the application onto the same conductive substrate 101, a field emission type emitter array can be constructed.

In the field emission type emitter according to the first embodiment, in a manner similar to the conventional field emission type emitter which has already been mentioned, by applying an electric field of about $10^6$ V/cm or more between the gate electrode 105 and the cathode 103, the electron emission can be performed without heating the cathode 103 and it is sufficient to set a gate voltage to a value within a range about from tens to 100 V. Since the electron emission from the cathode 103 needs to be executed in the vacuum of about $10^{-6}$ Torr or less, the field emission type emitter according to the first embodiment is actually sealed in the vacuum by opposite plates and other members (not shown).

A manufacturing method of the field emission type emitter according to the first embodiment constructed as mentioned above will now be described.

Figure 4A:
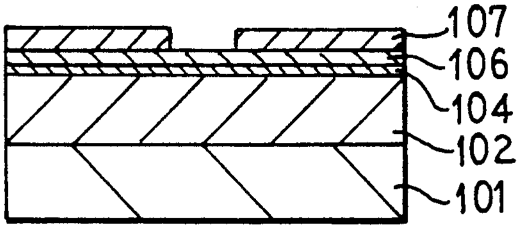
FIGS. 4A to 4D are cross sectional views for explaining a manufacturing method of the field emission type emitter shown in FIG. 3.

As shown in FIG. 4A, the insulating film 102 is first formed on the conductive substrate 101 by, for instance, a CVD method. Then, the polycrystalline Si film 104 and a refractory metal silicide film 106 such as a $WSi_x$ film are sequentially formed on the insulating film 102 by the CVD method. A resist pattern 107 having a shape corresponding to a gate electrode to be formed is subsequently formed onto the refractory metal silicide film 106 by a lithography.

Figure 4B:
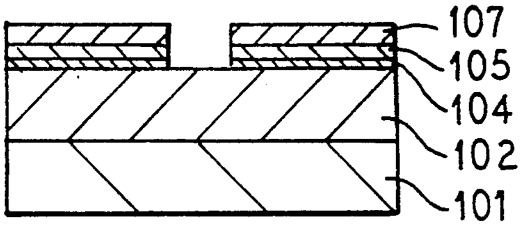

The resist pattern 107 is used as a mask and the refractory metal silicide film 106 and the polycrystalline Si film 104 are sequentially etched by a wet etching method or a dry etching method. Thus, as shown in FIG. 4B, the gate electrode 105 is formed and the polycrystalline Si film 104 is patterned so as to have the same shape as that of the gate electrode 105.

Figure 4C:
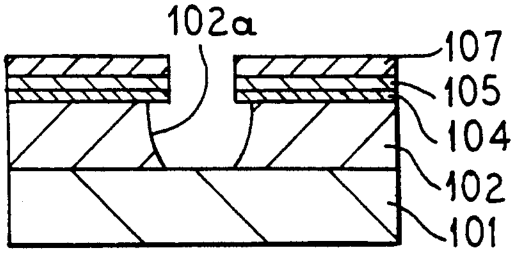

Subsequently, the resist pattern 107, gate electrode 105, and polycrystalline Si film 104 are used as masks and the insulating film 102 is etched by a wet etching method using an etchant of, for example, the hydrofluoric acid system, thereby forming the cavity 102*a* as shown in FIG. 4C. The wet etching can be also executed after the resist pattern 107 was removed.

Figure 4D:
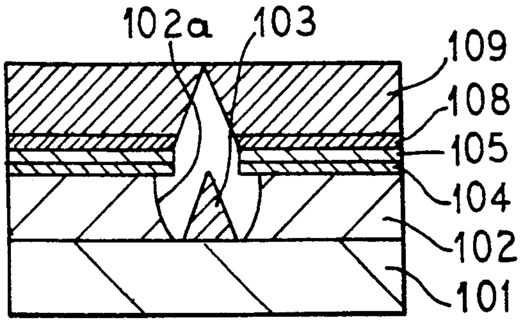

After the resist pattern 107 was removed, as shown in FIG. 4D, by obliquely executing an evaporation deposition to the substrate surface in an oblique direction, a peeling-off layer 108 made of, e.g., Al or nickel (Ni) is formed on the gate electrode 105. After that, for instance, Mo, W, or the like is evaporation deposited as a material to form a cathode in the direction perpendicular to the substrate surface. Thus, the cathode 103 is formed on the conductive substrate 101 in the cavity 102*a*. Reference numeral 109 denotes a metal film which has been evaporation deposited onto the peeling-off layer 108.

The peeling-off layer 108 is then removed by a lift-off method together with a metal film 109 formed on the peeling-off layer 108, thereby completing a target field emission type emitter as shown in FIG. 3.

As mentioned above, according to the first embodiment, since the gate electrode 105 is made of refractory metal silicide such as $WSi_x$, the gate electrode 105 is not oxidized in the manufacturing processes. Therefore, the reduction of the electric conductivity of the gate electrode 105 by the oxidation can be prevented. Consequently, electrons can be stably emitted from the cathode 103.

The deformation of the gate electrode 105 by the oxidation can be also prevented. Moreover, since refractory metal silicide as a material of the gate electrode 105 is formed by the CVD method, the internal residual stress of the gate electrode 105 can be reduced by controlling the Si composition ratio x of refractory metal silicide. Thus, the deformation of the gate electrode 105 can be also prevented by such a decrease in internal residual stress. Further, since the polycrystalline Si film 104 is formed between the gate electrode 105 and the insulating film 102, an adhesive performance of the gate electrode 102 to the underlayer can be improved. Thus, it is possible to effectively prevent that the gate electrode 105 is peeled off from the underlayer due to the deformation.

Since refractory metal silicide such as $WSi_x$ as a material of the gate electrode 105 is chemically stable and has a good chemical resistance, it is convenient on manufacturing.

The field emission type emitter according to the first embodiment is suitable for use in, for instance, a flat CRT.

As the conductive substrate 101 in the first embodiment, for instance, it is also possible to use a substrate which is obtained by forming a conductive film made of metal such as chromium (Cr) or Al onto an insulating substrate such as glass substrate or ceramics substrate by a whole surface or in a line shape.

In the first embodiment, the cavity 102*a* has been formed by the wet etching method. The cavity 102*a*, however, can be also formed by an anisotropic etching method such as an RIE method. In the case of using the anisotropic etching method, the cavity 102*a* having side walls which are almost perpendicular to the substrate surface is formed.

Further, refractory metal silicide as a material forming the gate electrode 105 can be also formed by, for example, a sputtering method.

Figure 5:
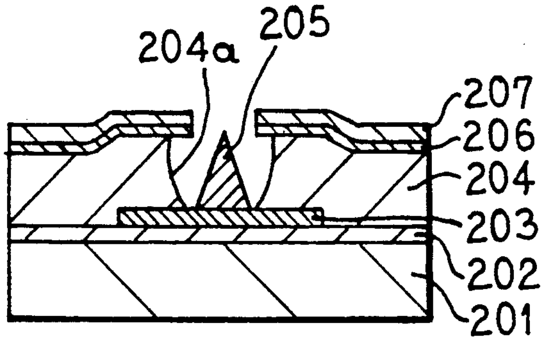
FIG. 5 is a cross sectional view showing a field emission type emitter according to the second embodiment of the invention.

FIG. 5 shows a field emission type emitter according to the second embodiment of the invention.

As shown in FIG. 5, in the field emission type emitter according to the second embodiment, an insulating film 202 such as $SiO_2$ film or $SiN_x$ film is formed on a glass substrate 201. A line-shaped conductive film (cathode line) 203 made of metal such as Cr, Al, or the like is formed on the insulating film 202. Reference numeral 204 denotes an insulating film such as an $SiO_2$ film having a thickness of about 1 μm. A cavity 204*a* having, for example, a circular flat plane shape is formed in the insulating film 204. A conical cathode 205 having a pointed tip and made of metal such as Mo, W, or the like having a high melting point and a low work functions is formed on-the conductive film 203 in the cavity 204*a*.

A gate electrode 207 made of refractory metal silicide such as tungsten silicide ($WSi_x$) or molybdenum silicide ($MoSi_x$) is formed over the insulating film 204 around the cavity 204*a* through a polycrystalline Si film 206 so as to surround the cathode 205. A thickness of polycrystalline film 206 is set to a value within a range, e.g., about from 500 to 1000 Å. A thickness of refractory metal silicide film such as a $WSi_x$ film which forms the gate electrode 207 is set to a value within a range, e.g., from 0.2 to 0.5 μm. A Si composition ratio x of $WSi_x$ is preferably selected to a value within a range, e.g., from 2.4 to 2.8. When a value of x lies within such a range, the internal residual stress upon formation of the $WSi_x$ film is minimum. Further, if $x>2$, $SiO_2$ is likely to be formed when $WSi_x$ is oxidized, so that the oxidation of W is effectively suppressed. A diameter of an opening portion of each of the gate electrode 207 and the polycrystalline film 206 just over the cathode 205 is set to, e.g., about 1 μm.

In the field emission type emitter according to the second embodiment, in a manner similar to the conventional field emission type emitter which has already been mentioned, by applying an electric field of about $10^6$ V/cm or more between the gate electrode 207 and the cathode 205, the electrons can be emitted without heating the cathode 205. It is sufficient to set a gate voltage to a value within a range about from tens to 100 V. Since it is necessary to perform the electron emission from the cathode 205 in the vacuum of about $10^{-6}$ Torr or less, the field emission type emitter according to the second embodiment is actually sealed in the vacuum by opposite plates and other members (not shown).

A method of manufacturing the field emission type emitter according to the second embodiment constructed as mentioned above will now be described.

Figure 6A:
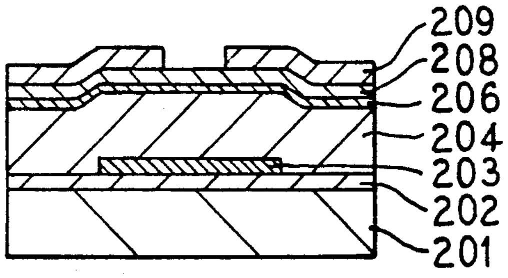
FIGS. 6A to 6D are cross sectional views for explaining a manufacturing method of the field emission type emitter shown in FIG. 5.

As shown in FIG. 6A, the insulating film 202 is first formed onto the glass substrate 201 by, e.g., a CVD method. After that, a conductive film such as a metal film is formed onto the insulating film 202 by, for instance, a sputtering method. The conductive film is patterned in a predetermined shape and the conductive film 203 of a line shape is formed. Subsequently, the insulating film 204, polycrystalline film 206 and a refractory metal silicide film 208 such as a $WSi_x$ film are sequentially formed onto the whole surface of the conductive film 203 by, e.g., the CVD method. A resist pattern 209 having a shape corresponding to a gate electrode to be formed is formed onto the refractory metal silicide film 208 by a lithography.

Figure 6B:
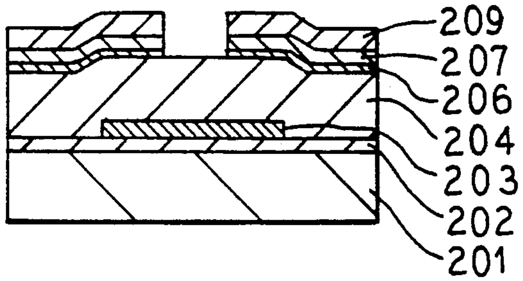

Then, the resist pattern 209 is used as a mask and the refractory metal silicide film 208 and polycrystalline Si film 206 are sequentially etched by a wet etching method or a dry etching method. Due to this, as shown in FIG. 6B, the gate electrode 207 is formed and the polycrystalline Si film 206 is patterned into the same shape as that of the gate electrode 207.

Figure 6C:
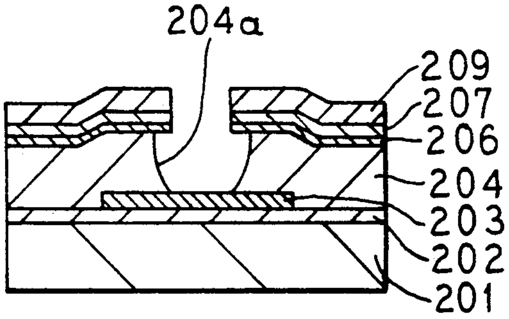

The resist pattern 209, gate electrode 207, and polycrystalline Si film 206 are used as masks and the insulating film 204 is etched by a wet etching method using an etchant of, for example, the hydrofluoric acid system, thereby forming the cavity 204*a* as shown in FIG. 6C. The wet etching can be also executed after the resist pattern 209 was removed.

Figure 6D:
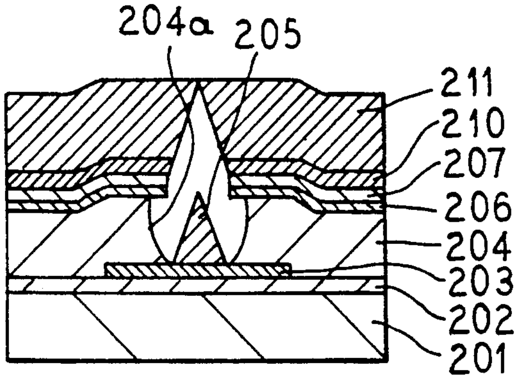

After the resist pattern 209 was removed, as shown in FIG. 6D, an oblique evaporation deposition is executed in an oblique direction to the substrate surface, thereby forming a peeling-off layer 210 made of, e.g., Al or Ni onto the gate electrode 207. After that, for instance, Mo, W, or the like is evaporation deposited as a material to form a cathode in the direction perpendicular to the substrate surface. Thus, the cathode 205 is formed onto the conductive film 203 in the cavity 204*a*. Reference numeral 211 denotes a metal film which has been evaporation deposited onto the peeling-off layer 210.

After that, the peeling-off layer 210 is removed by a lift-off method together with the metal film 211 formed on the peeling-off layer 210, thereby completing a target field emission type emitter as shown in FIG. 5.

As mentioned above, according to the second embodiment, there is used the glass substrate 201 which is cheaper than the Si substrate and in which a danger of the occurrence of a crack or a warp is small and a large area can be easily obtained. Therefore, the manufacturing costs of the field emission type emitter can be reduced. A manufacturing yield of the field emission type emitter can be improved because a danger such that a warp or a crack of the substrate occurs is small. Moreover, it is also possible to easily realize a large area of a flat pannel display such as a flat CRT by a field emission type emitter array.

Further, the problem of the instability of the electron emission from the cathode 205 due to an unstable potential of the surface of the glass substrate 201 can be solved by forming the insulating film 202 onto the glass substrate 201 and by forming the cathode 205 over the insulating film 202 through the conductive film 203.

According to the second embodiment, since the gate electrode 207 has been made of refractory metal silicide such as $WSi_x$ which is hardly oxidized, the gate electrode 207 is not oxidized in the manufacturing processes. Thus, a decrease in electric conductivity of the gate electrode 207 due to the oxidation can be prevented. Consequently, the electron emission from the cathode 205 can be stably executed. The deformation of the gate electrode 207 due to the oxidation can be prevented. Since refractory metal silicide as a material of the gate electrode 207 has been formed by the CVD method, the internal residual stress of the gate electrode 207 can be reduced by controlling the Si composition ratio x of refractory metal silicide. Thus, the deformation of the gate electrode 207 can be also prevented by such a decrease in internal residual stress. Further, since the polycrystalline Si film 206 has been formed between the gate electrode 207 and the insulating film 204, the adhesive performance of the gate electrode 207 to the underlayer can be improved. Thus, it is possible to effectively prevent that the gate electrode 207 is peeled off from the underlayer due to the deformation. Since refractory metal silicide such as $WSi_x$ is chemically stable and has a good chemical resistance, it is convenient on manufacturing.

The field emission type emitter according to the second embodiment is suitable for use in, e.g., a flat CRT of a large area.

Figure 7:
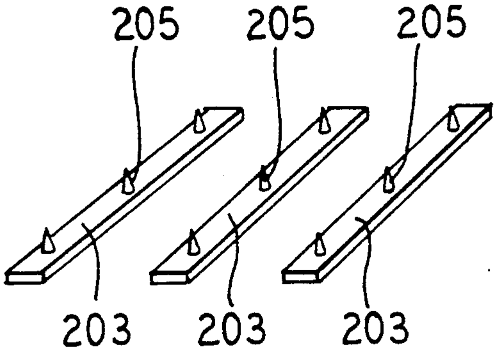
FIG. 7 is a perspective view showing the third embodiment of the invention in which line-shaped conductive films formed on a glass substrate and an arrangement example of cathodes formed on the conductive films are shown.

FIG. 7 shows the third embodiment of the invention.

As shown in FIG. 7, in the third embodiment, by forming a plurality of line-shaped conductive films 203 in parallel with each other and by arranging plurality of cathodes 205 onto each of the conductive films 203 in a straight line, the cathodes 205 can be driven every conductive film 203.

Figure 8:
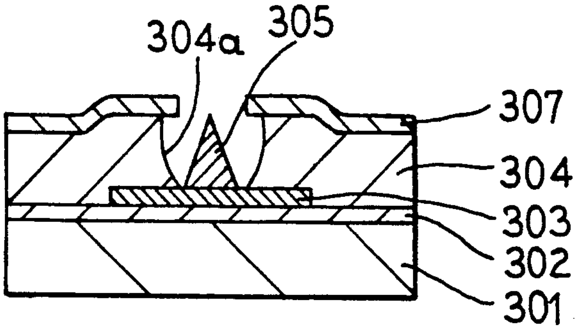
FIG. 8 is a cross sectional view showing a field emission type emitter according to the fourth embodiment of the invention.

FIG. 8 shows a field emission type emitter according to the fourth embodiment of the invention.

As shown in FIG. 8, the field emission type emitter according to the fourth embodiment differs from the field emission type emitter according to the second embodiment with respect to points that the gate electrode 307 is made of refractory metal such as W, Mo, Cr, or the like, lanthanum hexa boride ($LAB_6$), or the like and that the polycrystalline Si film is not formed. Since the other construction is similar to that of the second embodiment, its description is omitted.

According to the fourth embodiment, since the glass substrate 301 is used, the manufacturing costs of the field emission type emitter can be reduced. It is easily possible to realize a large area of a flat pannel display such as a flat CRT by a field emission type emitter array. A danger such that a crack or warp of the substrate occurs can be reduced.

Figure 9:
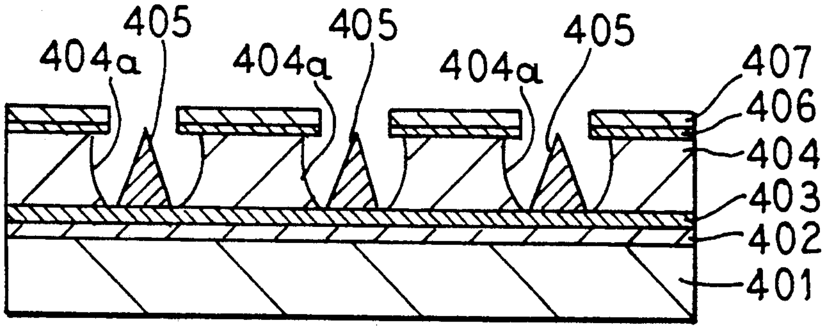
FIG. 9 is a cross sectional view showing a field emission type emitter according to the fifth embodiment of the invention.

FIG. 9 shows a field emission type emitter according to the fifth embodiment of the invention.

As shown in FIG. 9, the field emission type emitter according to the fifth embodiment has a construction similar to the field emission type emitter according to the second embodiment except that the conductive film 403 is formed on the whole surface of the insulating film 402.

According to the fifth embodiment, advantages owing to the use of the glass substrate 401 as mentioned in the second embodiment can be obtained.

Although the cavity in the second, fourth and fifth embodiments has been formed by the wet etching method, the cavity can be also formed by an anisotropic etching method such as an RIE method. In the case of using the anisotropic etching method, the cavity having side walls which are almost perpendicular to the substrate surface is formed.

Further, in the second and fifth embodiments, refractory metal silicide as a material which forms the gate electrode can be also formed by, for instance, a sputtering method or a evaporation deposition method.

Figure 10:
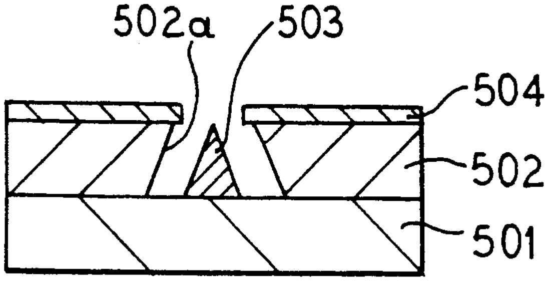
FIG. 10 is a cross sectional view showing a field emission type emitter according to the sixth embodiment of the invention.

FIG. 10 shows a field emission type emitter according to the sixth embodiment of the invention.

As shown in FIG. 10, in the field emission type emitter according to the sixth embodiment, an insulating film 502 such as an $SiO_2$ film having a thickness of about 1 μm is formed on a conductive substrate 501 such as an Si substrate in which impurities of, e.g., n type or p type have been doped at a high concentration. A cavity **502*a* having, for instance, a circular flat plane shape is formed in the insulating film 502**.

In the sixth embodiment, the side walls of the insulating film 502 in the portion of the cavity **502*a* have an inverse tapered shape. That is, a diameter of bottom portion of the cavity 502*a*** is larger than a diameter of the upper portion.

A conical cathode 503 having a pointed tip and made of metal such as Mo, W, or the like having a high melting point and a low work function is formed on the conductive substrate 501 in the cavity **502*a***.

A gate electrode 504 made of, for example, Mo, W, Cr, or the like is formed on the insulating film 502 around the cavity **502*a* so as to surround the cathode 503. A diameter of the opening portion of the gate electrode 504 just over the cathode 503** is set to, e.g., about 1 μm.

A field emission type emitter array can be constructed by arranging the cavities **502*a* and the cathodes 503 of the numbers corresponding to the application onto the same conductive substrate 501**.

In a manner similar to the conventional field emission type emitter which has already been mentioned, by applying an electric field of about $10^6$ V/cm or more between the gate electrode 504 and the cathode 503, the field emission type emitter according to the sixth embodiment can emit electrons without heating the cathode 503. It is sufficient to set a gate voltage to a value within a range about from tens to 100 V. Since it is necessary to perform the electron emission from the cathode 503 in the vacuum of about $10^{-6}$ Torr or less, the field emission type emitter according to the sixth embodiment is actually sealed in the vacuum by opposite plates and other members (not shown).

A method of manufacturing the field emission type emitter according to the sixth embodiment constructed as mentioned above will now be described.

Figure 11A:
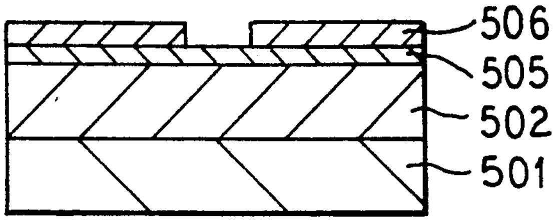
FIGS. 11A to 11E are cross sectional views for explaining a manufacturing method of the field emission type emitter shown in FIG. 10.

As shown in FIG. 11A, after the insulating film 502 was first formed onto the conductive substrate 501 by, for instance, a CVD method, a gate electrode forming metal film 505 made of Mo, W, Cr, or the like is formed onto the insulating film 502 by, e.g., a sputtering method. A resist pattern 506 having a shape corresponding to a gate electrode to be formed is formed onto the metal film 505 by a lithography.

Figure 11B:
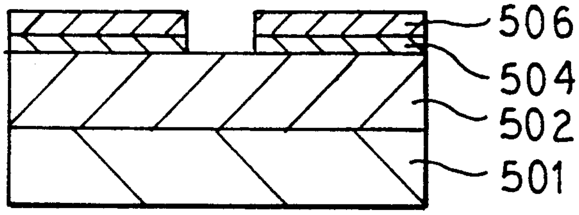

The metal film 505 is etched by a wet etching method or a dry etching method by using the resist pattern 506 as a mask, thereby forming the gate electrode 504 as shown in FIG. 11B.

Figure 11C:
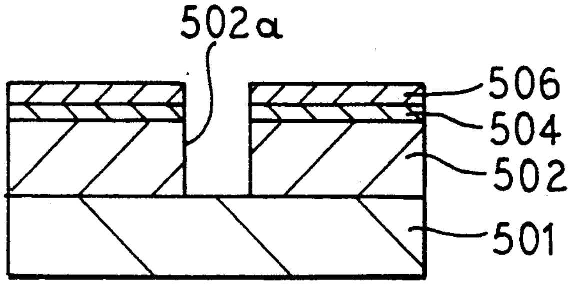

Subsequently, the insulating film 502 is anisotropically etched by, e.g., an RIE method in the direction perpendicular to the substrate surface by using the resist pattern 506 and the gate electrode 504 as masks, thereby forming the cavity 502a having side walls which are almost perpendicular to the substrate surface as shown in FIG. 11C.

Figure 11D:
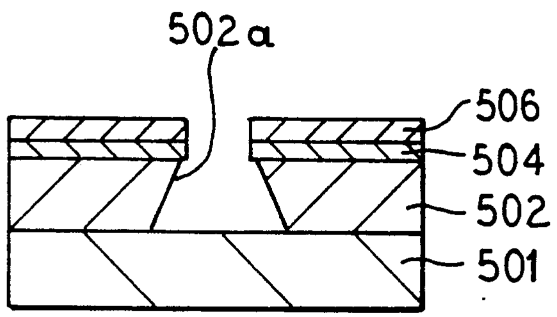

The insulating film 502 is now lightly etched by a wet etching method using an etchant of, for instance, the hydrofluoric acid system by using the resist pattern 506 and the gate electrode 504 as masks. A hydrogen fluoride (HF) concentration of the hydrofluoric acid system etchant is set to a value within a range, e.g., from 1 to 10%. By the light etching, as shown in FIG. 11D, a diameter of the bottom portion of the cavity 502a is larger than a diameter of the upper portion and the side walls of the insulating film 502 in the portion of the cavity 502a have an inverse tapered shape.

Figure 11E:
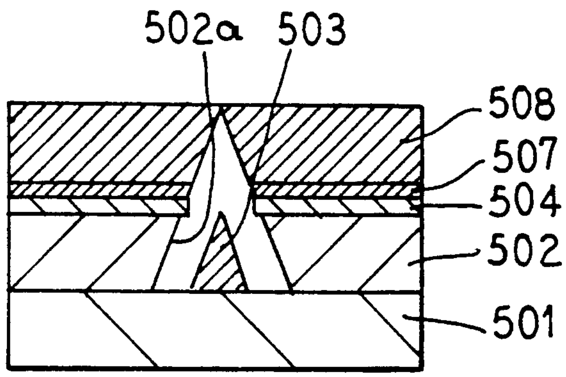

After the resist pattern 506 was removed, as shown in FIG. 11E, an oblique evaporation deposition is executed in the oblique direction for the substrate surface, thereby forming a peeling-off layer 507 made of, for example, Al or Ni onto the gate electrode 504. After that, for instance, Mo, W, or the like as a material to form a cathode is evaporation deposited in the direction perpendicular to the substrate surface. Thus, the cathode 503 is formed onto the conductive substrate 501 in the cavity 502a. Reference numeral 508 denotes a metal film which has been evaporation deposited onto the peeling-off layer 507.

After that, the peeling-off layer 507 is removed by a lift-off method together with the metal film 508 formed thereon, thereby completing a target field emission type emitter as shown in FIG. 10.

As mentioned above, according to the sixth embodiment, since the side walls of the insulating film 502 in the portion of the cavity 502a have an inverse tapered shape and almost all of the portions of the gate electrode 504 are supported by the insulating film 502, the gate electrode 504 can be made strong in terms of structure. Therefore, it is prevented that the gate electrode 504 is peeled off from the insulating film 502. On the other hand, since a diameter of the bottom portion of the cavity 502a is larger than a diameter of the upper portion, the cathode 503 can be formed in a preferable shape. Thus, a defective insulation between the cathode 503 and the gate electrode 504 can be prevented.

A tapered angle of the cavity 502a can be controlled by changing a concentration of the etchant which is used in the light etching by the wet etching method. Practically speaking, by setting an HF concentration of the hydrofluoric acid system etchant to a high concentration, the tapered angle can be increased. By setting the HF concentration to a low concentration, the tapered angle can be reduced. By changing the etching time of the light etching, withdrawing amounts of the side walls of the insulating film 502a, accordingly, a size of cavity 502a can be controlled.

The field emission type emitter according to the sixth embodiment is suitable for use in, for instance, a flat CRT.

Figure 12:
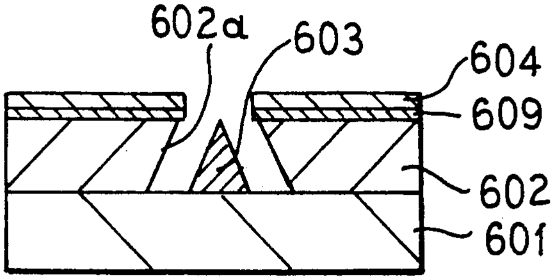
FIG. 12 is a cross sectional view showing a field emission type emitter according to the seventh embodiment of the invention.

FIG. 12 shows a field emission type emitter according to the seventh embodiment of the invention.

As shown in FIG. 12, in the seventh embodiment, the gate electrode 604 made of refractory metal silicide such as $WSi_x$ or $MoSi_x$ is formed on the insulating film 602 around the cavity 602a through a polycrystalline Si film 609 so as to surround the cathode 603. The other construction is similar to the sixth embodiment.

A thickness of polycrystalline Si film 609 is set to a value within a range, e.g., about from 500 to 1000 Å. A thickness of refractory metal silicide film such as a $WSi_x$ film which forms the gate electrode 604 is set to a value within a range, e.g., from 0.2 to 0.5 μm. An Si composition ratio x of $WSi_x$ is preferably selected to a value within a range, e.g., from 2.4 to 2.8. When a value of x lies within the above range, the internal residual stress upon formation of the $WSi_x$ film is minimum. Further, if $x>2$, $SiO_2$ is likely to be formed when $WSi_x$ is subjected to the oxidation, so that the oxidation of W is effectively suppressed.

The manufacturing method of the field emission type emitter according to the seventh embodiment is similar to that of the field emission type emitter of the sixth embodiment excluding a point that the polycrystalline Si film 609 and a refractory metal silicide film as a conductive film to form a gate electrode are sequentially formed onto the insulating film 602 by, e.g., a CVD method in the processes shown in FIG. 11A and, after that, the resist pattern 606 is formed on them.

According to the seventh embodiment, in addition to advantages similar to those in the sixth embodiment, there are following advantages. That is, since the gate electrode 604 is made of refractory metal silicide, the gate electrode 604 is not oxidized in the manufacturing processes, so that a deterioration in electric conductivity of the gate electrode 604 due to the oxidation can be prevented. Thus, the electron emission from the cathode 603 can be stably performed.

A deformation of the gate electrode 604 due to the oxidation can be prevented. Moreover, since refractory metal silicide as a material of the gate electrode 604 has been formed by a CVD method, the internal residual stress of the gate electrode 604 can be reduced by controlling the Si composition ratio x. Therefore, the deformation of the gate electrode 604 can be also prevented by the reduced internal residual stress. Further, since the polycrystalline Si film 609 is formed between the gate electrode 604 and the insulating film 602, an adhesive performance of the gate electrode 604 to the underlayer can be improved. Due to this, it is possible to effectively prevent that the gate electrode 604 is peeled off from the underlayer due to the deformation.

Since refractory metal silicide such as $WSi_x$ as a material of the gate electrode 604 is chemically stable and has a good chemical resistance, it is convenient on manufacturing.

Figure 13:
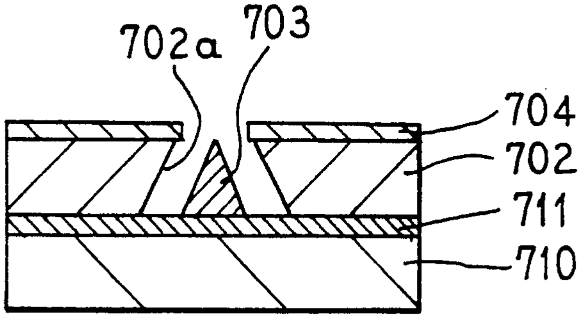
FIG. 13 is a cross sectional view showing a field emission type emitter according to the eighth embodiment of the invention.

FIG. 13 shows a field emission type emitter according to the eighth embodiment of the invention.

As shown in FIG. 3, the field emission type emitter according to the eighth embodiment differs from the field emission type emitter according to the sixth embodiment with respect to a point that a plate which is obtained by forming, for example, a line-shaped conductive film (cathode line) 711 made of metal such as Cr or Al onto an insulating substrate 710 such as glass substrate or ceramics substrate is used as a substrate. The other construction is similar to that of the sixth embodiment.

In the case of using the glass substrate as an insulating substrate 710, an insulating film such as $SiO_2$ film or $SiN_x$ film is preferably formed onto the glass substrate and the conductive film 711 is formed thereon. Thus, a problem of an unstable potential due to the instability of the surface of the glass substrate can be solved. The electron emission from the cathode 703 can be stably performed.

According to the eighth embodiment, the glass substrate or ceramics substrate which is cheaper than the Si substrate and in which a danger such that a crack or a warp occurs is smaller and a large area can be easily obtained is used as a substrate. Thus, the manufacturing costs of the field emission type emitter can be reduced. A deterioration in manufacturing yield due to a crack or a warp of the substrate can be prevented. It is also possible to easily realize a large area of a flat pannel display by a flat CRT by a field emission type emitter array or the like.

FIGS. 14A to 14D show a manufacturing method of a field emission type emitter according to the ninth embodiment of the invention.

Figure 14A:
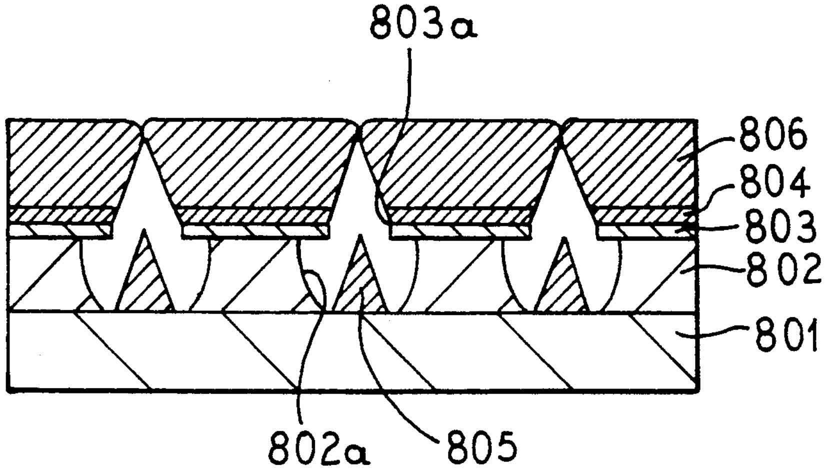
FIGS. 14A to 14D are cross sectional views for explaining a manufacturing method of the field emission type emitter according to the ninth embodiment of the invention.

In the ninth embodiment, the process proceeds to the state shown in FIG. 14A in the similar manner as the manufacturing method of the conventional field emission type emitter shown in FIGS. 1A to 1E. That is, after an insulating film 802 such as an $SiO_2$ film having a cavity 802*a* and a gate electrode 803 made of, e.g., Mo were formed on, e.g., a conductive Si substrate 801, a peeling-off layer 804 made of, e.g., A Al is formed by executing an oblique evaporation deposition in a direction with a predetermined inclination angle to the substrate surface, and subsequently a cathode 805 is formed onto the Si substrate 801 in the cavity 802*a* by executing an evaporation deposition of, e.g., Mo in the direction perpendicular to the substrate surface. Reference numeral 806 denotes a Mo film formed on the peeling-off layer 804 when the evaporation deposition is executed.

Figure 14B:
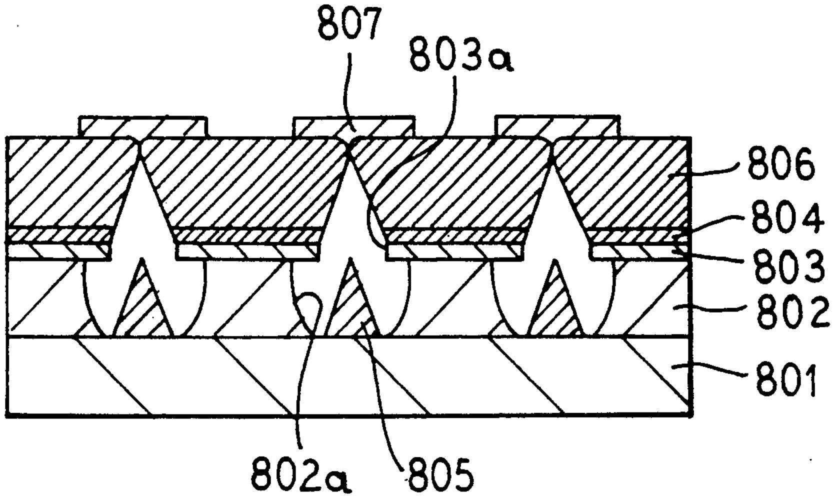

Then, as shown in FIG. 14B, a resist pattern 807 having a predetermined shape is formed onto the Mo film 806 by a lithography.

Figure 14C:
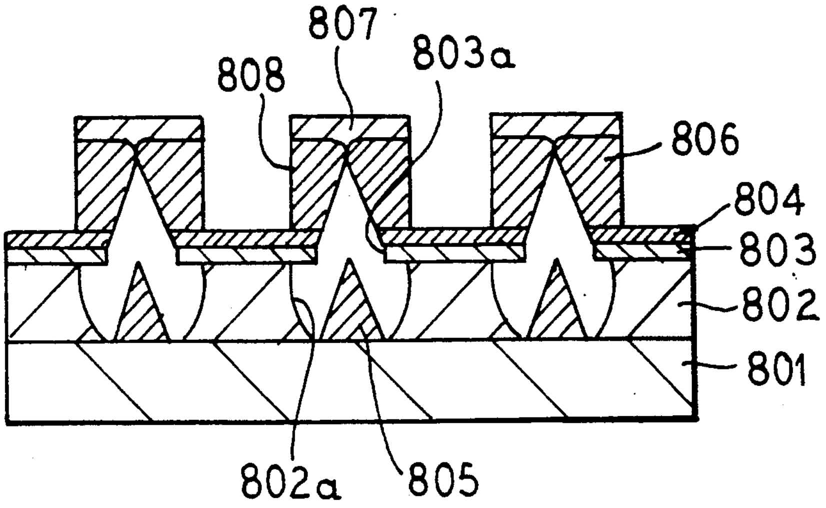
Figure 15:
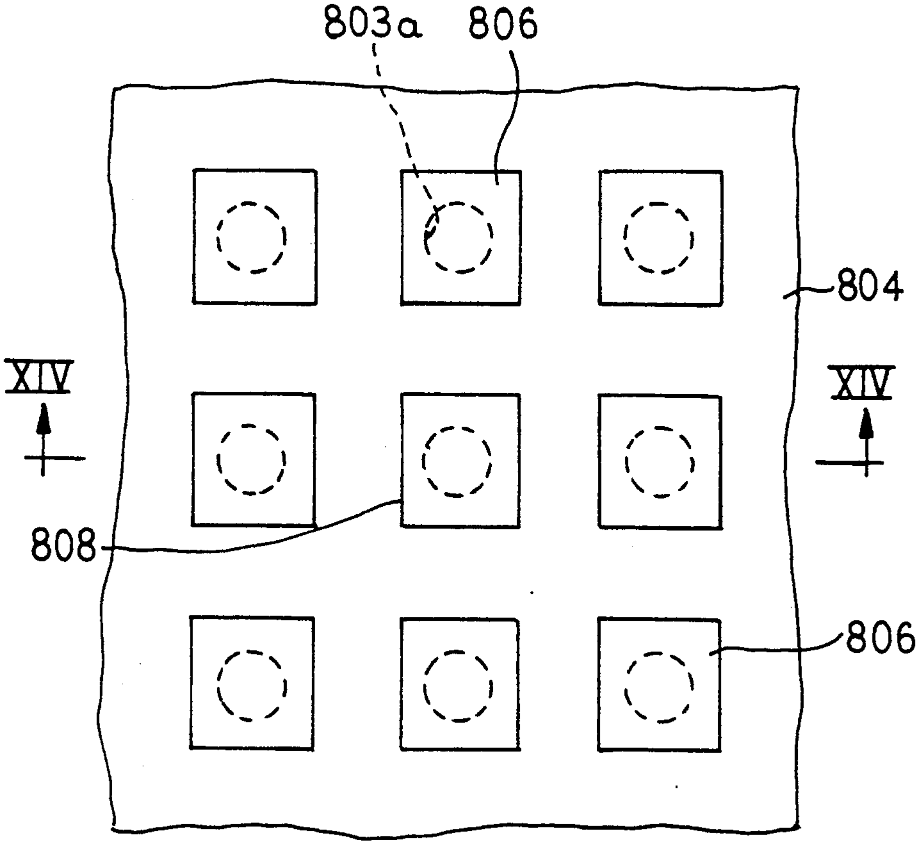
FIG. 15 is a plan view showing an example of a plane shape of the release groove formed in the Mo film formed on the insulating film in the manufacturing method shown in FIGS. 14A to 14D.

After that, the resist pattern 807 is used as a mask and the Mo film 806 is etched by, e.g., an RIE method in the direction perpendicular to the substrate surface, thereby forming a release groove 808 in the Mo film 806 and exposing the peeling-off layer 804 in the release groove 808 as shown in FIG. 14C. An example of the plane shape of the release groove 808 is shown in FIG. 15. FIG. 14C is a cross sectional view along line XIV—XIV of FIG. 15.

Subsequently, the peeling-off layer 804 is removed by a lift-off method together with the Mo film 806 formed thereon. As an etchant for lift-off, an etchant which has an etching action against the peeling-off layer 804 and has almost no etching action against the Mo film 806, gate electrode 803, insulating film 802, Si substrate 801, or the like is used.

At the time of the lift-off, since the etchant for lift-off easily reaches the peeling-off layer 804 through the release groove 808, the lift-off is executed completely with ease and in a short time and the peeling-off layer 804 and Mo film 806 are removed completely.

Figure 14D:
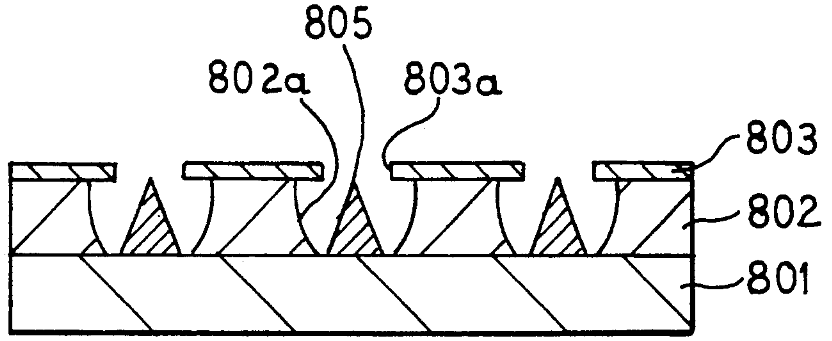

Due to this, as shown in FIG. 14D, a target field emission type emitter is completed.

Since it is necessary to allow the electrons to be emitted from the cathode 805 in the vacuum of about $10^{-6}$ Torr or less, the above field emission type emitter is actually sealed in a vacuum by opposite plates and other members (not shown).

As mentioned above, according to the ninth embodiment, since the release groove 808 is formed in the Mo film 806 which is formed on the peeling-off layer 804 when the cathode 805 is formed, and thereafter the lift-off is executed, the etchant for lift-off easily reaches the peeling-off layer 804 through the release groove 808, so that the peeling-off layer 804 can be completely removed by the lift-off method together with the Mo film 806 and in a short time.

The tenth embodiment of the invention in which the invention has been applied to the manufacturing of a field emission type flat CRT using a field emission type emitter array.

Figure 16:
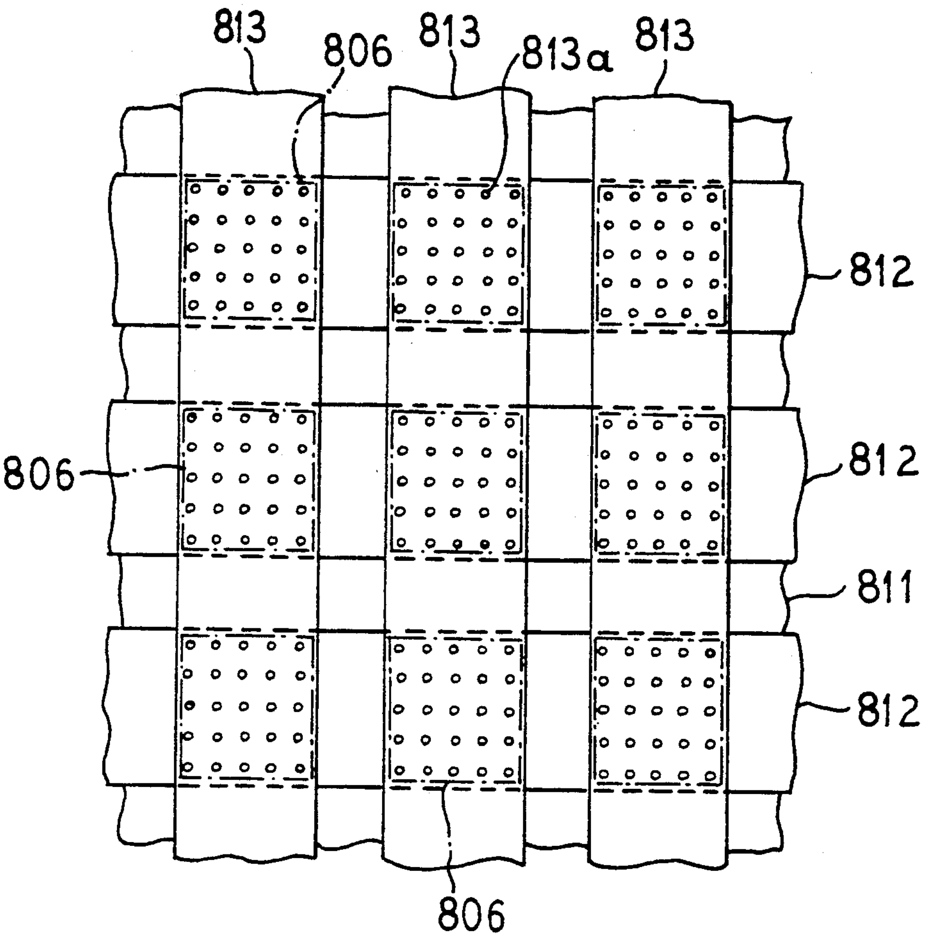
FIG. 16 is a plan view for explaining a manufacturing method of the field emission type flat CRT according to the tenth embodiment of the invention.
Figure 17:
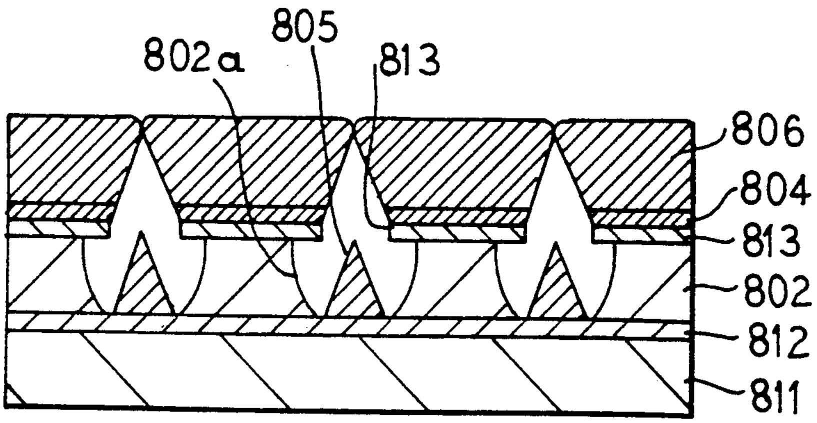
FIG. 17 is a partial enlarged cross sectional view along the cathode line of the field emission type flat CRT.

FIG. 16 shows a plan view of the state in which the formation of the cathode of the field emission type flat CRT according to the tenth embodiment was ended. FIG. 17 shows a partial enlarged sectional view along the cathode line of the field emission type flat CRT show in FIG. 16.

As shown in FIGS. 16 and 17, in the tenth embodiment, cathode lines 812 of the desired numbers are first formed onto a glass substrate 811 in parallel with each other. To eliminate a problem due to an unstable potential of the surface of the glass substrate, an insulating film (not shown) such as an $SiO_2$ film is preferably formed onto the glass substrate 811 and the cathode lines 812 are formed on the insulating film.

Then, the process is executed in a similar manner as shown in FIGS. 1A to 1E. That is, after an insulating film 802 was formed onto the whole surface, a Mo film, for example, is formed onto the insulating 802 as a material to form a gate line. Then, a resist pattern (not shown) having a shape corresponding to a gate line is formed onto the Mo film. After that, the resist pattern is used as a mask and the Mo film is etched. Due to this, gate lines 813 of the desired numbers comprising gate electrodes are formed in parallel with each other, meeting at right angles with the cathode lines 812. In this case, openings 813*a* of the desired numbers having, e.g., a circular shape are formed in a matrix fashion in the gate line 813 at the intersecting portions with the cathode lines 812.

Subsequently, the gate lines 813 in which the openings 813*a* were formed are used as masks and the insulating film 802 is etched, thereby forming cavities 802*a* in portions under the respective openings 813*a*.

After a peeling-off layer 804 was formed onto the gate lines 813 by executing an oblique evaporation deposition in a direction with a predetermined inclination angle to the substrate surface, cathodes 805 are formed onto the cathode lines 812 in the respective cavities 802*a* by executing an evaporation deposition in the direction perpendicular to the substrate surface. In this manner, a cathode array comprising a number of cathodes 805 arranged on the cathode lines 812 at the intersecting portions with the gate lines 813 in a matrix fashion are formed.

Then, a resist pattern (not shown), for example, is used as a mask and predetermined portions of the Mo film 806 formed on the peeling-off layer 804 are etched off, thereby forming release grooves (not shown). Next, the peeling-off layer 804 is etched by a lift-off method together with the Mo film 806. At the time of the lift-off, an etchant for lift-off easily reaches the peeling-off layer 804 through the release grooves in a manner similar to the ninth embodiment. As a result, the lift-off is executed completely.

After that, vacuum sealing is executed using a glass plate (not shown) on which a fluorescent material is formed on the side of the cathodes 805, or the like, thereby completing a target field emission type flat CRT.

According to the tenth embodiment, after the most part of the peeling-off layer 804 excluding a portion just over the cathode array comprising a number of cathodes 804 arranged in a matrix fashion was etched off and the release grooves 808 were formed, the lift-off is executed. Therefore, the etchant for lift-off easily reaches the peeling-off layer 804, so that the lift-off can be executed completely and in a short time.

In the ninth embodiment, the line-shaped release groove 808 is formed. However, the release groove 808 can have an arbitrary shape. For example, in the case where the cathodes 805 are densely formed, it is possible to form a number of small holes in the Mo film 806 at the places where the cathodes 805 are not formed and to use the small holes instead of a release groove 808.

It is also possible to leave a resist pattern which was used as a mask when an etching for forming the gate electrode 803 or the gate line 813 is executed and to form the peeling-off layer 804 on the resist pattern. In this case, the lift-off may be executed using an organic solvent, resist peeling-off solution (organic base), or the like after the release groove 808 was formed by etching the predetermined portion of the Mo film 806 and the peeling-off layer 804 and resist pattern was exposed in the release groove 808.

In the ninth and tenth embodiments, Mo is used as a material to form a cathode. However, as the material to form a cathode, it is possible to use W, titanium (Ti), $LaB_6$ or metal silicides such as $WSi_x$, titanium silicide ($TiSi_x$), platinum silicide ($PtSi_x$). Further, as a material of the peeling-off layer 804, it is possible to use materials other than Al, Ni, zinc (Zn), or the like.

What is claimed is:

1. A field emission type emitter comprising:
a conductive substrate;
an insulating film formed on the conductive substrate;
a cavity formed in the insulating film;
a cathode formed on the conductive substrate in the cavity; and
a gate electrode formed over the insulating film,
wherein the gate electrode is made of refractory metal silicide.

2. A field emission type emitter according to claim 1, wherein a polycrystalline silicon film is formed between the insulating film and the gate electrode.

3. A field emission type emitter comprising:
a conductive substrate;
an insulating film formed on the conductive substrate;
a cavity formed in the insulating film;
a cathode formed on the conductive substrate in the cavity; and
a gate electrode formed over the insulating film in the portion of the cavity so as to have an inverse tapered shape such that said cavity is wider at the bottom adjacent said substrate than at the top, wherein the gate electrode is formed of a refractory metal silicide.

4. A field emission type emitter according to claim 1 wherein said gate electrode is selected from the group comprising tungsten silicide ($WSi_x$) and molybdenum silicide ($MoSi_x$) wherein x has a value greater than 2.

5. A field emission type emitter according to claim 4, wherein x has a value from 2.4 to 2.8.

6. A field emission type emitter comprising: a glass substrate; a first insulating film formed on the glass substrate; a conductive film formed on the first insulating film; a second insulating film formed on the conductive film and the first insulating film; a cavity formed in the second insulating film; a cathode formed on the conductive film in the cavity; a gate electrode formed over the second insulating film; and wherein said gate electrode is selected from the group comprising tungsten silicide ($WSi_x$) and molybdenum silicide ($Mo\ Si_x$).

7. A field emission type emitter according to claim 6 wherein x has a value from 2.4 to 2.8.

* * * * *